US012122882B2

(12) United States Patent
Wloczysiak

(10) Patent No.: US 12,122,882 B2
(45) Date of Patent: Oct. 22, 2024

(54) MULTI-PART LIGNIN-BASED RESIN SYSTEM FOR DECORATIVE LAMINATES

(71) Applicant: WILSONART LLC, Austin, TX (US)

(72) Inventor: Philippe Wloczysiak, Baneuil (FR)

(73) Assignee: WILSONART LLC, Austin, TX (US)

( * ) Notice: Subject to any disclaimer, the term of this patent is extended or adjusted under 35 U.S.C. 154(b) by 129 days.

(21) Appl. No.: 17/454,428

(22) Filed: Nov. 10, 2021

(65) Prior Publication Data

US 2022/0153903 A1 May 19, 2022

Related U.S. Application Data

(60) Provisional application No. 63/113,285, filed on Nov. 13, 2020.

(51) Int. Cl.
*C08G 8/34* (2006.01)
*B31D 1/00* (2017.01)
*C08H 7/00* (2011.01)

(52) U.S. Cl.
CPC .............. *C08G 8/34* (2013.01); *B31D 1/0075* (2013.01); *C08H 6/00* (2013.01)

(58) Field of Classification Search
CPC ....... C08G 8/08; B31D 1/0075; C09J 197/005
See application file for complete search history.

(56) References Cited

U.S. PATENT DOCUMENTS

| | | | |
|---|---|---|---|
| 3,090,700 A | 5/1963 | Ball et al. | |
| 3,185,654 A | 5/1965 | Ball et al. | |
| 3,216,839 A | 11/1965 | Webster | |
| 3,294,582 A | 12/1966 | Suchy | |
| 3,931,072 A * | 1/1976 | Coyle | C08G 8/28 |
| | | | 156/335 |
| 4,105,606 A | 8/1978 | Forss et al. | |
| 4,113,675 A * | 9/1978 | Clarke | C08G 8/08 |
| | | | 156/335 |
| 4,130,515 A | 12/1978 | Bornstein | |
| 4,303,562 A | 12/1981 | Hollis, Jr. et al. | |
| 4,306,999 A | 12/1981 | Adams et al. | |
| 4,324,747 A | 4/1982 | Sudan et al. | |
| 4,332,589 A * | 6/1982 | Lin | C09B 67/0086 |
| | | | 8/589 |
| 4,404,334 A | 9/1983 | Bornstein | |
| 4,423,173 A | 12/1983 | Janiga | |
| 4,476,193 A | 10/1984 | Seidel et al. | |
| 4,521,336 A | 6/1985 | Dilling | |
| 4,537,941 A | 8/1985 | Kambanis et al. | |
| 4,559,097 A | 12/1985 | Janiga | |
| RE32,408 E * | 4/1987 | Janiga | C08L 61/14 |
| | | | 527/403 |
| 4,764,597 A | 8/1988 | Dilling | |
| 4,957,557 A | 9/1990 | Dimitri | |
| 5,008,378 A | 4/1991 | Dimitri | |
| 5,202,403 A * | 4/1993 | Doering | C09D 161/00 |
| | | | 530/502 |
| 5,260,405 A * | 11/1993 | Gardziella | D04H 1/64 |
| | | | 525/405 |
| 5,684,114 A | 11/1997 | Phillips et al. | |
| 7,807,749 B2 | 10/2010 | Pisanova et al. | |
| 8,178,600 B2 | 5/2012 | Kelly | |
| 8,445,563 B2 | 5/2013 | Winterowd et al. | |
| 8,501,841 B2 | 8/2013 | Winterowd et al. | |
| 8,563,633 B2 | 10/2013 | Kawashima et al. | |
| 8,748,537 B2 | 6/2014 | Naskar et al. | |
| 8,859,707 B2 | 10/2014 | Brizius | |
| 9,023,919 B2 | 5/2015 | Krueger et al. | |
| 9,090,731 B2 | 7/2015 | Winterowd | |
| 9,109,148 B2 | 8/2015 | Valkonen | |
| 9,157,016 B2 | 10/2015 | Hagiopol et al. | |
| 9,163,169 B2 | 10/2015 | Balogh et al. | |
| 9,169,385 B2 | 10/2015 | Baxter et al. | |
| 9,243,114 B2 | 1/2016 | Williamson et al. | |
| 9,404,025 B1 | 8/2016 | Holte | |
| 9,458,298 B2 | 10/2016 | Sniady et al. | |
| 9,464,193 B2 | 10/2016 | Hagiopol et al. | |
| 9,464,219 B2 | 10/2016 | Pietarinen et al. | |
| 9,469,795 B2 * | 10/2016 | Valkonen | C09J 161/12 |
| 9,505,964 B2 | 11/2016 | Berlin | |
| 9,586,338 B2 | 3/2017 | Sniady et al. | |
| 9,587,077 B2 | 3/2017 | Williamson et al. | |
| 9,587,115 B2 | 3/2017 | Sniady et al. | |
| 9,610,706 B2 | 4/2017 | Cothran et al. | |
| 9,617,452 B2 * | 4/2017 | Cothran | B27N 3/02 |
| 9,683,139 B1 | 6/2017 | Tillman et al. | |
| 9,815,985 B2 | 11/2017 | Naskar et al. | |

(Continued)

FOREIGN PATENT DOCUMENTS

| | | |
|---|---|---|
| CA | 1068426 A | 12/1979 |
| CA | 1084829 A | 9/1980 |

(Continued)

OTHER PUBLICATIONS

Taverna et al. (BioResources 10(4), 8325-8338) (Year: 2015).*
RJ Seidl, HK Burr, CN Ferguson, GE Mackin (1944), "Properties of laminated plastics made from lignin and lignin-phenolic resin-impregnated papers," Report n°1595 of States Department of Agriculture, Forest Service, Forest Products Laboratory, Madison, Wisconsin.
J.-S.M. Kazayawoko, B. Riedl, J. Poliquin (1992), "A Lignin-Phenol-Formaldehyde Binder for Particleboard," International Journal of the Biology, Chemistry, Physics and Technology of Wood, vol. 46 (3), Jan. 1, 1992.

(Continued)

*Primary Examiner* — Liam J Heincer
(74) *Attorney, Agent, or Firm* — Welsh Flaxman & Gitler LLC

(57) ABSTRACT

A method for making a multi-part resin system includes forming a lignin-formaldehyde resin, forming a phenol-formaldehyde resin, and mixing the lignin-formaldehyde resin and the phenol-formaldehyde to form the multi-part resin system.

18 Claims, 1 Drawing Sheet

(56) References Cited

U.S. PATENT DOCUMENTS

| | | |
|---|---|---|
| 9,834,646 B2 | 12/2017 | Baxter et al. |
| 9,909,041 B2 | 3/2018 | Yeager et al. |
| 9,914,870 B2 | 3/2018 | Washburn et al. |
| 9,982,174 B2 | 5/2018 | Berlin |
| 10,017,636 B2 | 7/2018 | Valkonen et al. |
| 10,035,913 B2 | 7/2018 | Hampson et al. |
| 10,160,823 B2 | 12/2018 | Delmas et al. |
| 10,246,619 B2 | 4/2019 | Pietarinen et al. |
| 10,259,903 B2 | 4/2019 | Pietarinen et al. |
| 10,273,388 B1 | 4/2019 | Tillman |
| 10,301,437 B2 | 5/2019 | Pietarinen et al. |
| 10,421,212 B2 | 9/2019 | Sniady et al. |
| 10,487,101 B2 | 11/2019 | Pietarinen et al. |
| 10,711,153 B2 | 7/2020 | Zafar et al. |
| 10,717,873 B2 | 7/2020 | Zafar et al. |
| 10,738,025 B2 | 8/2020 | Hagiopol et al. |
| 10,808,068 B2 | 10/2020 | Maiorana et al. |
| 10,894,855 B2 | 1/2021 | Pietarinen et al. |
| 10,913,824 B2 | 2/2021 | Bode et al. |
| 11,084,931 B2 | 8/2021 | Areskogh et al. |
| 11,104,774 B2 | 8/2021 | Areskogh et al. |
| 11,111,372 B2 | 9/2021 | Zhang et al. |
| 11,130,257 B2 * | 9/2021 | Zafar ............... C09D 161/34 |
| 11,136,451 B2 | 10/2021 | Zhang et al. |
| 11,155,683 B2 | 10/2021 | Sarkas et al. |
| 11,214,716 B2 | 1/2022 | Shi et al. |
| 2002/0065400 A1* | 5/2002 | Raskin .................. C08G 8/28 |
| | | 530/500 |
| 2005/0250900 A1 | 11/2005 | Stofko |
| 2011/0159768 A1 | 6/2011 | Crescimanno et al. |
| 2011/0245381 A1* | 10/2011 | Winterowd ............ C08L 97/02 |
| | | 524/14 |
| 2013/0078437 A1* | 3/2013 | Symkens .................. B44C 1/00 |
| | | 428/203 |
| 2014/0011042 A1 | 1/2014 | Sugawara et al. |
| 2014/0171379 A1 | 6/2014 | Jansen et al. |
| 2014/0242867 A1 | 8/2014 | Jansen et al. |
| 2015/0159061 A1* | 6/2015 | Kouisni ................ C09J 161/06 |
| | | 524/841 |
| 2015/0210904 A1* | 7/2015 | Cothran ................ B32B 21/14 |
| | | 156/283 |
| 2015/0329753 A1 | 11/2015 | Billington et al. |
| 2015/0344737 A1 | 12/2015 | Bode et al. |
| 2016/0096985 A1 | 4/2016 | Knight et al. |
| 2018/0078916 A1 | 3/2018 | Washburn et al. |
| 2018/0273755 A1 | 9/2018 | Cobb et al. |
| 2018/0319984 A1 | 11/2018 | Hampson et al. |
| 2018/0362689 A1 | 12/2018 | Jimenez et al. |
| 2018/0371252 A1 | 12/2018 | Carrick et al. |
| 2019/0153274 A1 | 5/2019 | Markesinis et al. |
| 2019/0177585 A1 | 6/2019 | Pietarinen et al. |
| 2020/0040022 A1 | 2/2020 | Pietarinen et al. |
| 2020/0079960 A1 | 3/2020 | Zafar et al. |
| 2020/0157287 A1 | 5/2020 | Nasli et al. |
| 2020/0190328 A1 | 6/2020 | Hampson et al. |
| 2020/0216672 A1* | 7/2020 | Zafar ................... C08L 97/005 |
| 2020/0347231 A1 | 11/2020 | Hampson et al. |
| 2021/0009618 A1* | 1/2021 | Jobber ................ C09J 197/005 |
| 2021/0009745 A1 | 1/2021 | Maiorana et al. |
| 2021/0016466 A1 | 1/2021 | Fleckenstein et al. |
| 2021/0040361 A1 | 2/2021 | Park et al. |
| 2021/0087401 A1 | 3/2021 | Hampson et al. |
| 2021/0189200 A1 | 6/2021 | Shi et al. |
| 2021/0214557 A1 | 7/2021 | Hampson et al. |
| 2021/0238367 A1 | 8/2021 | Nasli et al. |
| 2021/0238424 A1* | 8/2021 | Nasli Bakir .......... C09J 197/005 |
| 2021/0238464 A1* | 8/2021 | Nasli Bakir .......... C08L 97/005 |
| 2021/0253922 A1 | 8/2021 | Nasli et al. |
| 2021/0340379 A1 | 11/2021 | Hampson et al. |
| 2021/0371718 A1 | 12/2021 | Johannsen et al. |
| 2021/0388200 A1 | 12/2021 | Nasli et al. |

FOREIGN PATENT DOCUMENTS

| | | |
|---|---|---|
| CA | 1153294 A1 | 9/1983 |
| CN | 101492522 A | 7/2009 |
| CN | 103131019 A | 6/2013 |
| CN | 104087219 A | 10/2014 |
| CN | 105419727 A | 3/2016 |
| CN | 105950088 A | 9/2016 |
| CN | 106279584 A | 1/2017 |
| CN | 107286905 A | 10/2017 |
| CN | 107699173 A | 2/2018 |
| CN | 108003822 A | 5/2018 |
| CN | 108299787 A | 7/2018 |
| CN | 108794715 A | 11/2018 |
| CN | 108949078 A | 12/2018 |
| CN | 109535441 A | 3/2019 |
| CN | 111040688 A | 4/2020 |
| CN | 111393667 A | 7/2020 |
| CN | 111621263 A | 9/2020 |
| CN | 112029058 A | 12/2020 |
| CN | 112625652 A | 4/2021 |
| DE | 2949182 A1 | 7/1980 |
| EP | 1334997 A1 | 8/2003 |
| EP | 2758457 A1 | 7/2014 |
| EP | 2814885 A1 | 12/2014 |
| EP | 2918627 A1 | 9/2015 |
| EP | 2993201 A1 | 3/2016 |
| EP | 3074410 A1 | 10/2016 |
| EP | 3083651 A1 | 10/2016 |
| EP | 3783008 A1 | 2/2021 |
| EP | 3865551 A1 | 8/2021 |
| GB | 1049128 A | 11/1966 |
| JP | 2010248309 A | 11/2010 |
| NO | 2021150864 A1 | 7/2021 |
| WO | 9424192 A1 | 10/1994 |
| WO | 2014080033 A2 | 5/2014 |
| WO | 2015117106 A1 | 8/2015 |
| WO | 2015142158 A1 | 9/2015 |
| WO | 201755464 A1 | 4/2017 |
| WO | 201807429 A1 | 1/2018 |
| WO | 2018109262 A1 | 6/2018 |
| WO | 2018190720 A1 | 10/2018 |
| WO | 2018193166 A1 | 10/2018 |
| WO | 2018205020 A1 | 11/2018 |
| WO | 2019202477 A1 | 10/2019 |
| WO | 202070337 A1 | 4/2020 |
| WO | 202075032 A1 | 4/2020 |
| WO | 2020109983 A1 | 6/2020 |
| WO | 2020217209 A1 | 10/2020 |
| WO | 2020261087 A1 | 12/2020 |
| WO | 202105266 A1 | 1/2021 |
| WO | 2021124125 A1 | 6/2021 |
| WO | 2021124127 A1 | 6/2021 |
| WO | 2021124129 A1 | 6/2021 |
| WO | 2021197624 A1 | 10/2021 |
| WO | 2021197637 A1 | 10/2021 |

OTHER PUBLICATIONS

N.S.Cetin, N.Özmen (2002), "Use of Organosolv lignin in phenol-formaldehyde resins for particleboard production I. organosolv lignin modified resins," International Journal of Adhesion & Adhesives 22 (2002) 477-480.

M.V.Alonso, M.Oliet, F.Rodriguez, G.Astarloa, J.M.Echeverria (2004), "Use of a Methylolated Softwood Ammonium Lignosulfonate As Partial Substitute of Phenol in Resol Resins Manufacture," Journal of Applied Polymer Science, vol. 94, 643-650 (2004).

Marion Thébault, Ya Li, Christopher Beuc, Stephan Frömel-Frybort, Edith-Martha Zikulnig-Rusch, Larysa Kutuzova and Andreas Kandelbauer, Impregnated Paper-Based Decorative Laminates Prepared from Lignin-Substituted Phenolic Resins, Journal of Renewable Materials, JRM, 2020, vol. 8, No. 10, DOI:10.32604/jrm.2020.09755.

L.Hu, H.Pan, Y.Zhou, M.Zhang (2011), "Methods to Improve Lignin's Reactivity as a Phenol Substitute and as Replacement for Other Phenolic Compounds: A Brief Review," BioRessources 6 (3), 3515-3525.

(56) References Cited

OTHER PUBLICATIONS

W. Peng, B. Riedl, A. O. Barry (1993), "Study on the kinetics of lignin methylolation," Journal of Applied Polymer Science vol. 48, Issue10, 1757-1763.

M.Ghorbani, A.R.Mahendran, H.W.G.van Herwijnen, F.Liebner, J.Konnerth (2018), "Paper-based laminates produced with kraft lignin-rich phenol-formaldehyde resoles meet requirements for outdoor usage," European Journal of Wood and Wood Products 76, 481-487.

M.Wang, M.Leitch, C(Charles)Xu (2009), "Synthesis of phenol-formaldehyde resol resins using organosolv pine lignins," European Polymer Journal 45, 3380-3388.

N.S. Cetin, Studies on Lignin-Based Adhesives for Particleboard Panels, Turk J Agric For 27 (2003) 183-189 © TÜB<TAK.

\* cited by examiner

MULTI-PART LIGNIN-BASED RESIN SYSTEM FOR DECORATIVE LAMINATES

CROSS-REFERENCE TO RELATED APPLICATIONS

This application claims the benefit of U.S. Provisional Patent Application Ser. No. 63/113,285, entitled "MULTI-PART LIGNIN-BASED RESIN SYSTEM FOR DECORATIVE LAMINATES," filed Nov. 13, 2020, which is incorporated by reference.

BACKGROUND OF THE INVENTION

1. Field of the Invention

The current invention is related to the production of decorative high pressure laminates built up with a mixture of lignin-formaldehyde resin and phenol-formaldehyde resin, in particular, a resol type phenol-formaldehyde resin. In particular, the invention describes the use, for the treating of kraft paper type which composes the core of the decorative laminates, of a lignin which has been crafted by formaldehyde to create methylol chemical functions leading to a thermosetting resin. This lignin is a phenolic resin type and gives the final product the same properties as a classical resol type phenolic resin.

2. Description of the Related Art

High pressure laminates are made of layers of paper treated with thermosetting resins and polymerized with a process combining pressure and temperature as described below. The process of forming high pressure laminates is defined as the simultaneous application of pressure and temperature to allow the flow of the impregnated resins and then the polycondensation of the thermosetting resins leading to a homogeneous and non-porous material whose specific gravity has increased ($\geq 1.35$ g/cm3). The top layer(s) that compose(s) the decorative surface has (have) various colors and patterns, and is (are) treated with current melamine resins and/or other kinds of resins (polyurethanes acrylates for example).

The inner layers, also named core layers, are composed of paper treated with phenolic resins, amino plastics resins, or even mixes of phenolic and amino plastics resins. These resins often contain additives that lead to either lower cost resins or special properties, fire rated for example.

For a long time, studies have been conducted on introducing lignin into phenolic resins. R J Seidl, H K Burr, C N Ferguson, G E Mackin (1944), "Properties of laminated plastics made from lignin and lignin-phenolic resin-impregnated papers," Report n° 1595 of States Department of Agriculture, Forest Service, Forest Products Laboratory, Madison, Wisconsin; Frank J Ball, Joseph B Doughty, William G Vardell (1965), "Composition containing resole and lignin in free acid form and process for preparing same," U.S. Pat. No. 3,185,654 May 25, 1965; David Webster (1965), "Free lignin solutions and method of making and using same," U.S. Pat. No. 3,216,839 Nov. 9, 1965; Leopold F. Bornstein (1978), "Lignin-based composition board binder comprising a copolymer of a lignosulfonate, melamine and an aldehyde," U.S. Pat. No. 4,130,515, Dec. 19, 1978. For 20 to 30 years, efforts have doubled and numerous laboratories and/or industries have invested in the valorization and/or the use of this raw material in chemical applications. Clarke at al. (1978), "Methylolated kraft lignin polymer resin," U.S. Pat. No. 4,113,675 Sep. 12, 1978; J.-S. M. Kazayawoko, B. Riedl, J. Poliquin (1992), "A Lignin-Phenol-Formaldehyde Binder for Particleboard," International Journal of the Biology, Chemistry, Physics and Technology of Wood, Volume 46 (3), Jan. 1, 1992; Seidel et al. (1984), "Sulfur Containing Lignin Modified Alkaline Earth Treated Phenolic Impregnating Resins For Core Layers of Humidity Resistant Laminates," U.S. Pat. No. 4,476,193 Oct. 9, 1984; N. S. Cetin, N. Özmen (2002), "Use of Organosolv lignin in phenol-formaldehyde resins for particleboard production I. organosolv lignin modified resins," International Journal of Adhesion & Adhesives 22 (2002) 477-480; M. Raskin, L. O. Ioffe, A. Z. Pukis, M. H. Wolf (2002), "Resin Material and method of Producing same", US Patent, 2002/0065400 A1, May 30, 2002; M. V. Alonso, M. Oliet, F. Rodriguez, G. Astarloa, J. M. Echeverria (2004), "Use of a Methylolated Softwood Ammonium Lignosulfonate As Partial Substitute of Phenol in Resol Resins Manufacture," Journal of Applied Polymer Science, Vol. 94, 643-650 (2004). In 1965, Ball disclosed an adhesive for the manufacture of plywood, fiber board, particle board, and similar products, containing the combination of phenol formaldehyde resin and a lignin derivative, such as lignosulfonates, or alkali lignins. Frank J Ball, Joseph B Doughty, William G Vardell (1965). "Composition containing resole and lignin in free acid form and process for preparing same", U.S. Pat. No. 3,185,654 May 25, 1965.

This interest is related to the necessity for replacing current raw materials from the petrochemical industry with renewable materials.

SUMMARY

In one aspect a method for making a multi-part resin system includes forming a lignin-formaldehyde resin, forming a phenol-formaldehyde resin, and mixing the lignin-formaldehyde resin and the phenol-formaldehyde to form the multi-part resin system.

In some embodiments, the phenol-formaldehyde is a resol type phenol-formaldehyde.

In some embodiments, the method includes the step of diluting the multi-part resin system.

In some embodiments, the multi-part resin system is diluted with methanol.

In some embodiments forming the lignin-formaldehyde resin comprises introducing water and heating the water to between 70° C. and 95° C., introducing lignin and mixing with the water for at least 15 minutes at 80° C. to 95° C., introducing an alkali, introducing formaldehyde, and mixing the water, lignin, alkali, and formaldehyde, and maintaining the water, lignin, alkali, and formaldehyde mixture between 70° C. and 95° C.

In some embodiments, the water, lignin, alkali, and formaldehyde mixture is maintained at a temperature between 70° C. and 95° C. for a time between 20 minutes and 180 minutes.

In some embodiments, the alkali is potassium hydroxide KOH 50%.

In some embodiments, the lignin is either in powder form with a solid content of 85% to 95% or in the form of a paste whose solid content is around 50% to 65%.

In some embodiments, mixing includes mixing the phenol-formaldehyde resin and a lignin-formaldehyde resin at between 40° C. and 70° C.

In some embodiments, mixing occurs for at least 60 minutes to have the proper homogenous resin.

In some embodiments, the method further includes adjusting the level of pH in the multi-part resin system.

In some embodiments adjusting the level of pH includes adding para toluene sulfonic.

In some embodiments, the method further includes the step of impregnating a core paper with the multi-part resin system and forming a decorative laminate with the impregnated core paper.

In another aspect, a multi-part resin system includes a lignin-formaldehyde resin and a phenolic resin.

In a further aspect, a method for making a decorative laminate includes preparing a decorative sheet and preparing at least one core layer sheet. Preparing the at least one core layer sheet includes making a multi-part resin system and impregnating the at least one core layer sheet with the multi-part resin system. Making the multi-part resin system includes forming a lignin-formaldehyde resin, forming a phenol-formaldehyde, and mixing the lignin-formaldehyde resin and the phenol-formaldehyde to form the multi-part resin system. The method also includes pressing and heating the decorative sheet and the at least one core layer sheet to form a decorative laminate.

BRIEF DESCRIPTION OF THE DRAWINGS

FIGS. 1A and 1B are schematics of decorative laminates in accordance with the present invention wherein FIG. 1A shows a decorative laminate with a single decorative layer positioned on top of the core layer and FIG. 1B shows a decorative laminate with decorative layers applied to both sides of the core layer.

DESCRIPTION

A detailed embodiment is disclosed herein. It should be understood, however, that the disclosed embodiment is are merely exemplary of the invention, which may be embodied in various forms. Therefore, the details disclosed herein are not to be interpreted as limiting, but merely as a basis for teaching one skilled in the art how to make and/or use the invention.

Figure 1A:
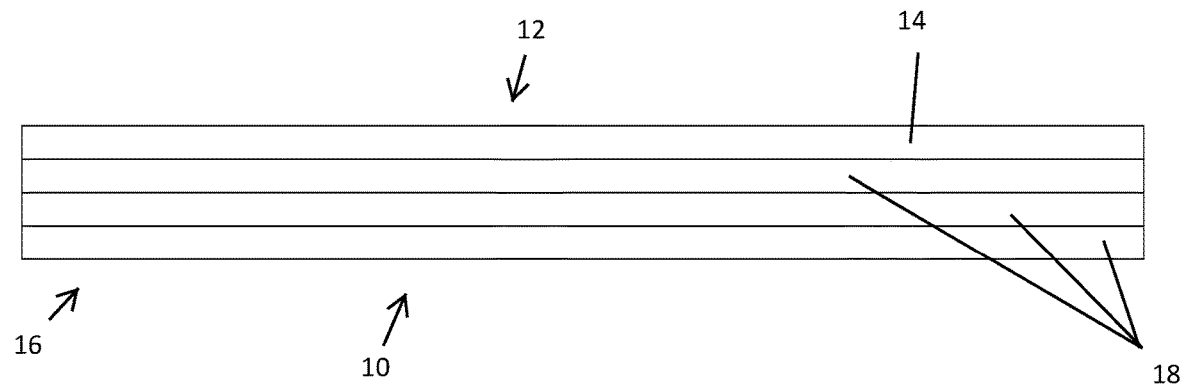
Figure 1B:
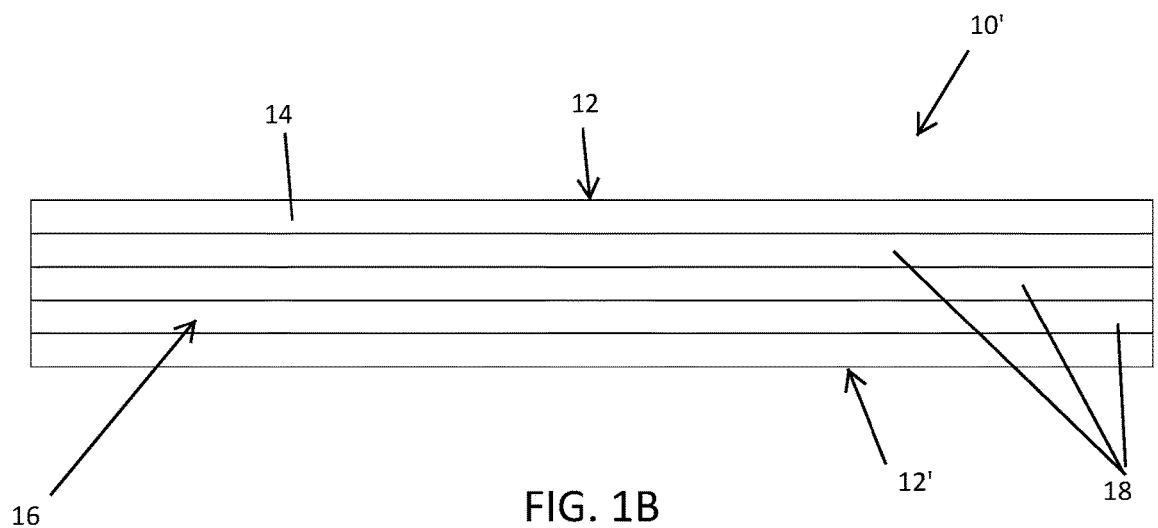

Referring now to the drawings, embodiments of a high pressure decorative laminate are disclosed in FIG. 1A and FIG. 1B. It should be appreciated that similar reference numerals are used in conjunction with the different embodiments to the extent the elements are similar or the same.

Briefly, and as will be described in greater detail below, the decorative laminate 10, 10' includes a decorative layer 12 and a core layer 16. The decorative layer 12 is composed of a resin impregnated decorative sheet 14 (or dry, unimpregnated decorative with a resin impregnated overlay sheet as discussed below). The core layer 16 is composed of at least one resin impregnated sheet of core paper 18 (sometimes referred to herein as "resin impregnated core sheet"), which is impregnated with a resin composed of the present multi-part resin system composed of a phenol-formaldehyde resin and a lignin-formaldehyde resin. The decorative laminate 10, 10' is manufactured by preparing the resin impregnated decorative sheet 14 and preparing at least one resin impregnated core sheet 18. Preparing the at least one resin impregnated core sheet 18 includes impregnating the core sheet 18 with a resin composition composed of the present multi-part resin system. The resin impregnated decorative sheet 14 and resin impregnated core sheet 18 are layered to form a laminate lay-up and the laminate lay-up is heated and pressed to consolidate and cure the decorative laminate 10, 10'.

In accordance with some embodiments of the present disclosure, the high pressure decorative laminate may include an overlay paper layer, a decorative layer, and a multi-part resin system core layer. It should be appreciated, however, that the layering pattern may be varied, somewhat, without departing from the spirit of the present disclosure.

The decorative layer 12 is composed of a conventional resin impregnated decorative sheet 14 positioned directly above (and/or below) the core layer 16. The decorative layer 12 is chosen from a wide array of sheets. For example, the decorative layer 12 may be a solid color (for example, white) or may include an aesthetically appealing pattern. Where the decorative layer 12 defines the top surface of the final high pressure laminate, the decorative layer 12 dictates the surface characteristics of the final decorative laminate 10. For example, the composition of the decorative layer 12 dictates the decorative laminate's resistance to chemical agents, heat, light, shock, and abrasion. While a disclosed embodiment presented in FIG. 1A shows a single decorative layer 12 positioned on top of the core layer 16, it is appreciated as shown with reference to FIG. 1B that decorative layers 12, 12' may be applied to both sides of the core layer 16 to produce a decorative laminate 10' with a decorative surface on both the top and bottom surfaces. Further, while a decorative layer composed of a single resin impregnated sheet is disclosed herein, it is appreciated the decorative layer may be composed of two or even three sheets.

As discussed above, the decorative layer 12 is composed of a sheet of decorative paper 14. The decorative sheets are commonly manufactured from high quality 60-205 grams/meter$^2$, pigment filled, alpha cellulose paper impregnated with amino plastic resin or/and polyurethane acrylate resin. Although the following disclosure discusses a resin impregnated decorative paper, it is appreciated a dry, unimpregnated decorative paper may be used (so long as a resin impregnated overlay sheet is positioned above the dry, unimpregnated decorative paper, in a manner known in the art, such that the dry, unimpregnated decorative paper is positioned between the overlay sheet and the core layer. The decorative paper 14, in accordance with an embodiment of the present disclosure, is impregnated with a resin content of approximately 0% to 82% (considering 0% accounts for the embodiment described above using a dry, unimpregnated decorative paper in conjunction with an overlay sheet. The resin impregnated decorative sheets 14 are subsequently dried, partially cured, and finally cut into sheets. The pigment filled, alpha cellulose paper of the decorative sheet may include a solid color, a decorative design, or a rotogravure reproduction of natural materials, such as, wood, marble, leather, etc. The aesthetic characteristics of the cellulose paper are revealed as the laminate's decorative design upon completion of the decorative laminate 10.

The core layer 16 is preferably composed of a plurality of resin impregnated core sheets 18 of what is commonly referred to as "saturating Kraft paper." While saturating Kraft paper is disclosed herein, it is appreciated, the paper used in the core is not limited to saturating Kraft paper, and papers made from recycled fibers that are suitable for laminates applications are known. For example, Kruger produces a paper made of 100% recycled that is suitable for laminates applications. Further, it is appreciated other paper materials and volume of sheets may be used without departing from the spirit of the present disclosure. In accordance with a disclosed embodiment, the core layer 16 includes two sheets of 160-550 grams/meter$^2$ resin impregnated Kraft paper. The saturating Kraft paper is impregnated with the present multi-part resin system and is partially cured (β-staged). The saturating Kraft paper is impregnated with a resin content of approximately 28% to 46%.

It is known that current phenol-formaldehyde resin with a molar ratio F (formaldehyde)/P (phenol)>1.5 allows the growth of a 3-dimensional network. For its part, the lignin does not have methylol (hydroxymethyl) function that can allow a 3-dimensional continuous network chemically bonded. Furthermore, in view of the size of the molecular weight of the oligomer chains, the steric hindrance limits the access of large molecules to reactive sites of aromatic cycles in the lignin. As these resins are designed to treat papers, the high molecular weight must be managed. Indeed, if it is quite easy to adjust the molecular weight for the current phenol-formaldehyde resin in order to treat the current papers, it is far more complicated with lignin.

As part of prior phenolic glue studies between 2014 and 2017, the lignin was studied as a reactant in a mix with phenol and formaldehyde. J.-S. M. Kazayawoko, B. Riedl, J. Poliquin (1992), "A Lignin-Phenol-Formaldehyde Binder for Particleboard," International Journal of the Biology, Chemistry, Physics and Technology of Wood, Volume 46 (3), Jan. 1, 1992; Areskogh et al. (2018), "An Activated Lignin Composition, A Method for the Manufacturing Thereof and Use Thereof," US Patent, 2018/0086916 A1, Mar. 29, 2018; D. Areskogh (2017), "A Method for Increasing the Reactivity of Lignin, A Resin Composition Comprising said Lignin and Use of said Resin Composition," 12 Jan. 2017 WO 2017/006215 A1. In the case of phenolic resins for high pressure laminates, thus for treating of paper, the present invention addresses the incorporation of lignins differently, and the strategy of the present invention focuses on considering lignin as a resin on its own right. This approach allowed for the present invention to not only simplify the total operations (steps), but also to easily adjust viscosities and reactivities.

Thus, the present multi-part resin system does not have a lignin-phenol-formaldehyde resin but two resins, one phenol-formaldehyde resin and one lignin-formaldehyde resin. In fact, in the literature, two methods are presented to easily activate: the phenolation [N. S. Cetin, N. Özmen (2002), "Use of Organosolv lignin in phenol-formaldehyde resins for particleboard production I. organosolv lignin modified resins," International Journal of Adhesion & Adhesives 22 (2002) 477-480; M. Raskin, L. O. Ioffe, A. Z. Pukis, M. H. Wolf (2002), "Resin Material and method of Producing same," US Patent, 2002/0065400 A1, May 30, 2002; Pietarinen et al. (2019), "Method for Treating Lignin and for Producing a Binder Composition," U.S. Pat. No. 10,301,437 B2, Mar. 28, 2019; Pietarinen (2015), "A Method for Treating Lignin and for Producing a Binder Composition," WO 2015/079107 A1 4 Jun. 2015; L. Hu, H. Pan, Y. Zhou, M. Zhang (2011), "Methods to Improve Lignin's Reactivity as a Phenol Substitute and as Replacement for Other Phenolic Compounds: A Brief Review," Bioresources 6 (3), 3515-3525] and the methylolation [Studies on Lignin-Based Adhesives for Particleboard Panels, Turk J Agric For 27 (2003) 183-189 © TÜBTAK; P. Dilling (1988), "Method for Methylolation of Lignin Material," U.S. Pat. No. 4,764,597A Aug. 16, 1988; W. Peng, B. Riedl, A. O. Barry (1993), "Study on the kinetics of lignin methylolation," Journal of Applied Polymer Science Vol. 48, Issue 10, 1757-1763]. And all works published and patented recently start with one of the two operations and then add either phenol or formaldehyde to complete the resin. M. Ghorbani, A. R. Mahendran, H. W. G. van Herwijnen, F. Liebner, J. Konnerth (2018), "Paper-based laminates produced with kraft lignin-rich phenol-formaldehyde resoles meet requirements for outdoor usage," European Journal of Wood and Wood Products 76, 481-487; Pietarinen (2013), "A Method for Increasing the Reactivity of Lignin," WO 2013/144454 A1, 3 Oct. 2013; M. Wang, M. Leitch, C(Charles) Xu (2009), "Synthesis of phenol-formaldehyde resol resins using organosolv pine lignins," European Polymer Journal 45, 3380-3388; Jobber A. S, Ferrari L., Helwegen K. M. F. (2018), "A method for preparing an activated lignin composition," WO 2018/190720 A1, 18 Oct. 2018; N. S. Cetin, N. Özmen (2002), "Use of Organosolv lignin in phenol-formaldehyde resins for particleboard production I. organosolv lignin modified resins," International Journal of Adhesion & Adhesives 22. (2002) 477-480.

The present invention goes in a different direction by considering lignin as a reactant or an oligomer that only needs additional methylol functions to enhance the growth of a three-dimensional network chemically bonded.

The present multi-part resin system is prepared with:
A Lignin-Formaldehyde like a resin,
  In alkali conditions
A phenolic resin employing current known procedures
  That way it is easy to adjust the final characteristics of the resin playing on
    The characteristics of the phenolic resin
      E.g., Formaldehyde/Phenol ratio (for example, 1.3 to 2.5), level of condensation, etc.
    The characteristics of lignin-based resin
      E.g., Formaldehyde/Lignin ratio, Time, Temperature, pH, etc.
    The ratio of Lignin-Formaldehyde Resin/Phenolic Resin
    The dilution with solvent.

As briefly discussed above, the multi-part resin system of the present invention is used to impregnate the sheets making up the core layer. In particular, the multi-part resin system includes a mix of a resol type phenol-formaldehyde and a lignin-formaldehyde resin.

The multi-part resin system is prepared by blending a resol type phenol-formaldehyde resin resol type commonly used in the laminate industry and a lignin-formaldehyde resin. The multi-part resin system is ultimately diluted with methanol and the quantity of methanol depends on the paper being treated.

The lignin-formaldehyde resin is prepared in the following manner:
Introducing water and heat up between 70° C. and 95° C.
Introducing lignin and mix for at least 15 minutes at 80° C. to 95° C.
Introducing an alkali, like potassium hydroxide KOH 50%
Introducing Formaldehyde
Maintaining the mixing between 70° C. and 95° C. for a time between 20 minutes and 180 minutes.

In accordance with a disclosed embodiment, the lignin is either in powder form with a solid content of 85% to 95% or in the form of a paste whose solid content is around 50% to 65%. While temperature and time parameters are disclosed above, it is appreciated other temperature and time parameters may be used without departing from the spirit of the invention.

Once the phenol-formaldehyde resin and a lignin-formaldehyde resin are prepared, the phenol-formaldehyde resin and a lignin-formaldehyde resin are mixed together at a temperature between 40° C. and 70° C. for at least 60 minutes to have the proper homogenous resin. In accordance with a disclosed embodiment, the lignin-formaldehyde resin and the phenol-formaldehyde resin are mixed at a ratio of 30/70 or 50/50. The operation is completed with a dilution with methanol and/or water to make the resin suitable for the treating of the papers. The level of dilution and the dilution composition depend on lignin/Phenol ratio and kind of paper. By way of example, a paper is impregnated using a double coater treater, wherein the viscosity is approximately 50 cps at 25° C. (solid around 40%). However, the same paper, and deep and squeeze roll treater, the viscosity is set at approximately 70 cps (solid around 45%). With other papers it has been found that a viscosity of 20 cps is acceptable with methanol dilution and resin impregnation with deep and squeeze rolls treater, but it is also possible to achieve similar results with water dilution and impregnation with a double coater system.

In addition, the level of pH and acid are adjusted to control the pH (between 8.5 and 9.5) depending on the ratio Base/Lignin. The best acid is Para toluene sulfonic acid, but other organic ones could be possible)

The multi-part resin may then be applied to the saturating Kraft paper and the polymerization of the composite is completed with the simultaneous application of heat and high pressure which characteristics are the following ones:

Once the appropriate layers of the laminate are formed, the sheets 14, 18 are stacked in a conventional manner, and the laminate lay-up is heated and pressed. In accordance with an embodiment of the present disclosure, the layers are first stacked and placed between steel plates. The laminate stack is then subjected to temperatures in the range of 130° C. to 160° C., and pressure of about 20 kg/cm$^2$ to 100 kg/cm$^2$ for a time sufficient to consolidate the laminate and cure the resins (generally about 20 minutes to 60 minutes). The pressure and heat force the resin in the paper sheets to flow, cure and consolidate the sheets into a unitary laminated mass referred to in the art as a decorative high pressure laminate. Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

The laminate is then cooled for approximately 10 minutes under pressure before it is ready for further processing in preparation for its use in the manufacture of various products. During this last operation, the surface is in contact with a plate or a release paper that gives the material the final texture.

The resulting high pressure laminate meets the standard EN 438. The high pressure laminate of the present invention also allows a dramatic reduction in phenol needed for the production of the decorative high pressure laminates. In addition, the free phenol of such resins is very low.

While specific temperatures, pressures, and times are described above, it should be appreciated that a variety of pressing techniques may be used without departing from the spirit of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for making a multi-part resin system used in the manufacture of decorative laminates, comprising:
    forming a lignin-formaldehyde resin consisting essentially of water, lignin, alkali, and formaldehyde;
    forming a phenol-formaldehyde resin;
    mixing the lignin-formaldehyde resin and the phenol-formaldehyde resin to form the multi-part resin system;
    diluting the multi-part resin system with methanol and/or water such that it has a viscosity from approximately 20 cps to approximately 70 cps and adjusting the pH to between 8.5 and 9.5.

2. The method according to claim 1, wherein the phenol-formaldehyde resin is a resol type phenol-formaldehyde.

3. The method according to claim 1, wherein forming the lignin-formaldehyde resin comprises introducing water and heating the water to between 70° C.and 95° C.;
    introducing lignin and mixing with the water for at least 15 minutes at 80° C. to 95° C.; introducing the alkali; introducing the formaldehyde; and mixing the water, lignin, alkali, and formaldehyde and maintaining the water, lignin, alkali, and formaldehyde mixture between 70° C. and 95° C.

4. The method according to claim 3, wherein the water, lignin, alkali, and formaldehyde mixture is maintained at a temperature between 70° C. and 95° C. for a time between 20 minutes and 180 minutes.

5. The method according to claim 4, wherein the lignin is either in powder form with a solid content of 85% to 95% or in the form of a paste whose solid content is around 50% to 65%.

6. The method according to claim 1, wherein mixing includes mixing the phenol-formaldehyde resin and a lignin-formaldehyde resin at around 40° C. to 70° C.

7. The method according to claim 1, further including adjusting a pH in the multi-part resin system.

8. The method according to claim 1, further including the step of impregnating a core paper with the multi-part resin system and forming a decorative laminate with the impregnated core paper.

9. A multi-part resin system, comprising:
    a lignin-formaldehyde resin consisting essentially of water, lignin, alkali, and formaldehyde; and
    a phenolic resin.

10. The multi-part resin system according to claim 9, wherein the lignin-formaldehyde resin is formed under alkali conditions.

11. A method for making a decorative laminate, comprising:
    preparing a decorative sheet impregnated;
    preparing at least one core layer sheet impregnated, wherein preparing the at least one core layer sheet includes making a multi-part resin system and impregnating the at least one core layer sheet with the multi-part resin system, wherein making the multi-part resin system includes forming a lignin-formaldehyde resin consisting essentially of water, lignin, alkali, and formaldehyde; forming a phenol-formaldehyde; mixing the lignin-formaldehyde resin and the phenol-formaldehyde to form the multi-part resin system, and diluting the multi-part resin system with methanol and/or water such that it has a viscosity from approximately 20 cps to approximately 70 cps and adjusting the pH to between 8.5 and 9.5;
    pressing and heating the decorative sheet and the at least one core layer sheet to form a decorative laminate.

12. The method according to claim 11, wherein the phenol-formaldehyde resin is a resol type phenol-formaldehyde resin.

13. The method according to claim 11, wherein forming the lignin-formaldehyde resin comprises introducing water and heating the water to between 70° C. and 95° C.;
   introducing lignin and mixing with the water for at least 15 minutes at 80° C. to 95° C.; introducing the alkali; introducing the formaldehyde; and mixing the water, lignin, alkali, and formaldehyde and maintaining the water, lignin, alkali, and formaldehyde mixture between 70° C. and 95° C.

14. The method according to claim 13, wherein the water, lignin, alkali, and formaldehyde mixture is maintained at a temperature between 70° C. and 95° C. for a time between 20 minutes and 180 minutes.

15. The method according to claim 14, wherein the lignin is either in powder form with a solid of 85-95% or in the form of a paste whose solid is around 50% to 65%.

16. The method according to claim 11, wherein mixing includes mixing the phenol-formaldehyde resin and a lignin-formaldehyde resin at around 40° C. to 70° C.

17. The method according to claim 11, further including adjusting a pH in the multi-part resin system.

18. The method according to claim 11, further including the step of impregnating a core paper with the multi-part resin system and forming a decorative laminate with the impregnated core paper.

\* \* \* \* \*